J. J. KELLY.
WHEEL.
APPLICATION FILED JUNE 22, 1908.
927,977.
Patented July 13, 1909.
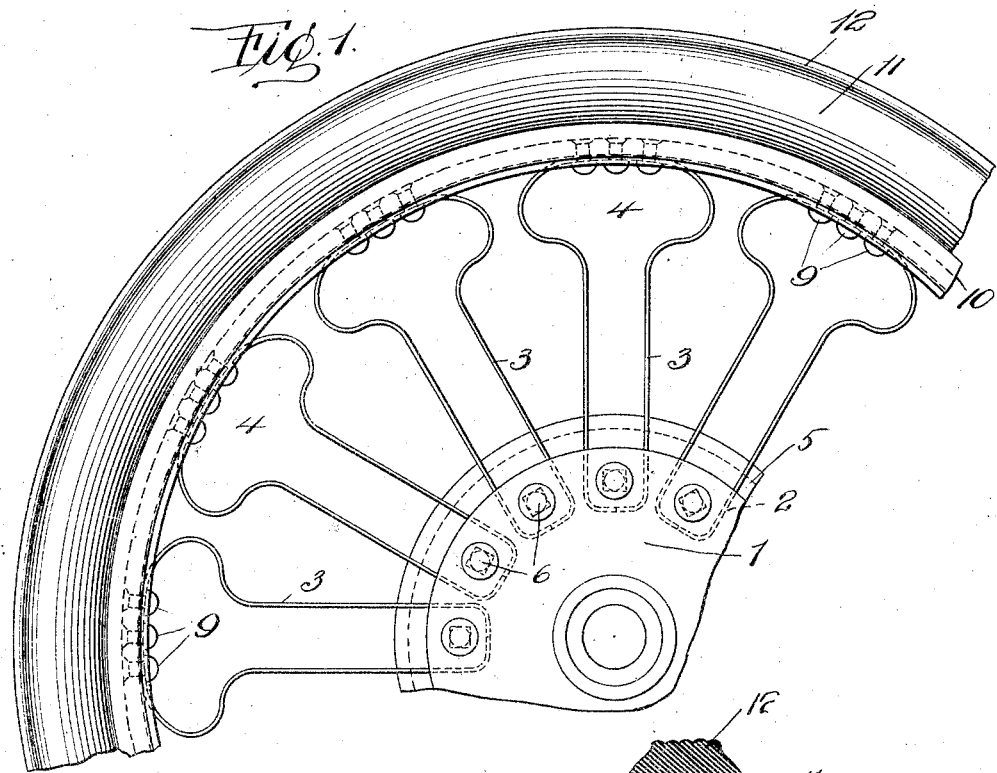
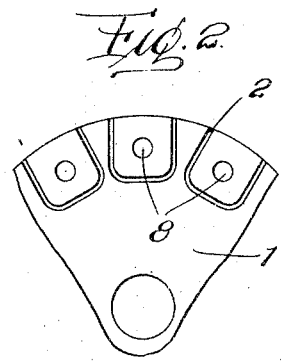
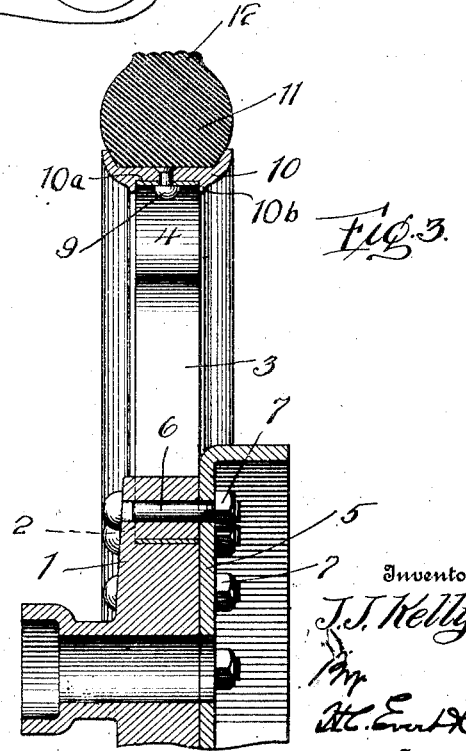

UNITED STATES PATENT OFFICE.

JAMES J. KELLY, OF CRAFTON, PENNSYLVANIA.

WHEEL.

No. 927,977.  Specification of Letters Patent.  Patented July 13, 1909.

Application filed June 22, 1908. Serial No. 439,740.

*To all whom it may concern:*

Be it known that I, JAMES J. KELLY, a citizen of the United States of America, residing at Crafton, in the county of Allegheny and State of Pennsylvania, have invented certain new and useful Improvements in Wheels, of which the following is a specification, reference being had therein to the accompanying drawing.

This invention relates to vehicle wheels, and more particularly to that type of wheel commonly used in connection with automobiles.

The primary object of this invention is to provide a strong and durable wheel having resilient spokes or hub supporting members for cushioning and resiliently supporting the body of an automobile or vehicle.

Another object of this invention is to obviate the necessity of using springs beneath the vehicle body for insuring an easy riding of the same.

A further object of the invention is to provide a wheel with resilient spokes arranged in such a manner that each spoke will share in supporting the hub of the wheel irrespective of the direction of pressure brought to bear upon the hub of the wheel.

A still further object of this invention is to provide a simple and inexpensive wheel having a plurality of resilient supporting units easily assembled.

A still further object of this invention is to obviate the necessity of using a pneumatic tire as a cushioning medium for wheels.

With the above and other objects in view which will more readily appear as the invention is better understood, the same consists in the novel construction, combination and arrangement of parts to be presently described and then specifically pointed out in the appended claim.

In the drawings:—Figure 1 is an elevation of a portion of a wheel constructed in accordance with my invention, Fig. 2 is a similar view of a portion of a hub, and Fig. 3 is a vertical sectional view of a portion of a wheel.

In the accompanying drawings, 1 designates a hub having a plurality of circumferentially arranged U-shaped grooves 2, said grooves extending from the inner face of the hub to within a short distance of the outer face of the hub and providing sockets for the resilient spokes or rim supporting members of the wheel. Each resilient spoke or rim supporting member is made of a flat resilient metallic strip bent to provide spaced parallel shank portions 3 and an oval-shaped head portion 4. The free or inner ends of the shank portions 3 are bent toward each and are received, together with a portion of the shanks, in the sockets 2 and are retained therein by an annular flanged plate 5 secured to the inner side of the hub 1 by bolts 6 and nuts 7, said bolts passing through openings 8 provided therefor circumferentially of the hub 1. The plate 5 is of a diameter greater than that of the hub 1, as clearly seen in Figs. 1 and 2, so as to extend beyond the periphery of the hub, and the width of the strips from which the spokes are formed is such as to fit neatly in the sockets 2, so that the edge of each spoke which lies toward the open sides of the sockets, is flush with the outer face of the hub, and these outer edges of the spokes are therefore engaged by the plate 5 and the spokes are firmly seated in the sockets and prevented from rattling, and, as the plate 5 extends beyond the periphery of the hub and is in engagement with the spokes beyond the hub, it will be apparent that a tightening of the nuts 7 causes the plate 5 to bear more firmly against the side edges of the spokes, beyond the hub, and effectually preventing any loosening of the spoke-ends in the spoke-sockets. The openings 8 are formed centrally between the two radially-extending branches of each socket, whereby the fastening means, *i. e.* the bolts 6, will firmly retain the resilient spokes or rim supporting members within the sockets. The flanged plate 5 can be readily used as a hub for a frictional brake band (not shown).

Suitably secured to the oval-shaped head portion of the spokes or members, preferably by rivets 9 is a felly or rim 10 for a solid rubber tire 11 having a circumferentially corrugated tread 12. A plurality of rivets 9 are used in connection with each spoke or member to insure a permanent fastening means. The felly or rim 10 is provided on the inner circumference thereof with an annular groove $10^a$ in which the end bar of the oval-shaped head 4 of each spoke is received, this groove being of a width corresponding to the width of the strip from which the spoke is formed, so that the end bar of each head fits neatly in the groove with the edges of the end bar of each spoke engaging the side walls $10^b$ of the groove $10^a$, thus firmly seating the spokes at their outer ends in the rim. The spokes being thus firmly seated at their outer ends throughout the major portion of the length of the end bar of each spoke, the hold-fast devices 9 are relieved of resisting any torsional strain placed on the spokes, such as would exist if the ends of the spokes simply abutted against the rim without being firmly seated in the rim.

Pressure brought to bear upon the hub 1 is equalized throughout the spokes of the wheel, a downward pressure on the hub causing a compression of the spokes in the lower half of the wheel and an elongation of the spokes in the upper half of the wheel, said compression and elongation being provided for by the oval-shaped heads 4 of each spoke or member, these heads flattening under compression and narrowing toward the hub when elongated.

A sufficient number of spokes are employed to insure stability and roadability of a vehicle constructed in accordance with my invention.

While in the drawings forming a part of this application there is illustrated the preferred embodiments of the invention, it is to be understood that the elements therein can be changed or varied as to shape, proportion and exact manner of assemblage without departing from the spirit of the invention.

Having now described my invention what I claim as new, is:—

In a vehicle wheel, a hub provided with substantially U-shaped radially-extending spoke-sockets open at the periphery of and at one side of the hub and closed at the opposite side of the hub, a wheel rim provided on its inner circumference with an annular groove, spokes connecting the wheel rim with the hub, each spoke formed from a piece of spring metal doubled to form spaced shank portions terminating at their outer ends in an oval-shaped head, the end bar of said head being seated in the groove in said rim with the side edges of the end bar engaging the side walls of the groove, the inner ends of the shank portions of each spoke being received in the spoke sockets and having one side edge thereof flush with the outer side of the hub, and a plate secured to the outer side of the hub, said plate being of greater diameter than the hub and engaging the outer side edges of said spoke shanks beyond the periphery of the hub.

In testimony whereof I affix my signature in the presence of two witnesses.

JAMES J. KELLY.

Witnesses:
MAX H. SROLOVITZ,
C. V. BROOKS.